United States Patent [19]

Yezrielev et al.

[11] Patent Number: 4,985,517

[45] Date of Patent: Jan. 15, 1991

[54] HIGH SOLIDS ACRYLIC-BASED COATINGS

[75] Inventors: Albert I. Yezrielev, Kendall Park, N.J.; Michael G. Romanelli, Brooklyn, N.Y.; William E. Wellman, Edison, N.J.

[73] Assignee: Exxon Chemical Patents, Inc., Linden, N.J.

[21] Appl. No.: 360,597

[22] Filed: Jun. 2, 1989

Related U.S. Application Data

[60] Division of Ser. No. 202,955, Jun. 6, 1988, Pat. No. 4,855,369, which is a continuation of Ser. No. 807,586, Dec. 11, 1985, abandoned.

[51] Int. Cl.$^5$ .............................................. C08F 2/06
[52] U.S. Cl. ................................. 526/208; 526/209; 526/212; 526/213; 526/216; 526/217; 526/320; 526/329
[58] Field of Search ............... 526/208, 209, 212, 213, 526/216, 217, 320, 329

[56] References Cited

U.S. PATENT DOCUMENTS

| | | |
|---|---|---|
| 3,271,375 | 9/1966 | Delacretaz et al. . |
| 3,926,925 | 12/1975 | Kuntz . |
| 3,959,225 | 5/1976 | Kuntz . |
| 3,968,148 | 7/1976 | Leister et al. . |
| 3,979,478 | 9/1976 | Gallacher . |
| 4,075,176 | 2/1978 | Gallacher . |
| 4,075,242 | 2/1978 | Rhum et al. . |
| 4,276,212 | 6/1981 | Khanna et al. . |
| 4,276,432 | 6/1981 | Ruum et al. . |
| 4,369,296 | 1/1983 | Podssun et al. . |
| 4,532,294 | 7/1985 | Bouboulis . |
| 4,758,642 | 7/1988 | Yezrielev et al. .................. 526/216 |

FOREIGN PATENT DOCUMENTS

| | | |
|---|---|---|
| 0027719 | 10/1980 | European Pat. Off. . |
| 0029339 | 11/1980 | European Pat. Off. . |
| 0029594 | 11/1980 | European Pat. Off. . |
| 0029683 | 11/1980 | European Pat. Off. . |

OTHER PUBLICATIONS

K. K. Mitra, "Electrostatic Application of Paint", *Paint India*, vol. 29, No. 9, pp. 52-56 (1979).

"Hexyl Acetate for the Coatings Industry" (Enjay Chemical Company), Published Prior to 1980.

D. Rhum et al., *J. Coatings Tech'n.*, vol. 55, No. 703, pp. 75-79 (Aug. 1983).

*Primary Examiner*—Bernard Lipman
*Attorney, Agent, or Firm*—J. B. Murray, Jr.; J. J. Mahon

[57] ABSTRACT

According to one aspect of the present invention, improved acrylic copolymer resins are provided which are formed by co-polymerization of a monomer mixture comprising hydroxy-substituted alkyl (meth)acrylates, alkyl methacrylates or vinyl aromatics, and higher alpha-olefins. The invention provides improved low molecular weight acrylic resins useful as components in high solids acrylic coatings suitable for electrostatic spraying.

2 Claims, No Drawings

HIGH SOLIDS ACRYLIC-BASED COATINGS

This application is a division of Ser. No. 202,955, filed June 6, 1988, now U.S. Pat. No. 4,855,369, issued Aug. 8, 1989, which was a continuation of Ser. No. 807,586, filed Dec. 11, 1985, and now abandoned. This application is also related to Ser. No. 807,585, filed Dec. 11, 1985, now U.S. Pat. No. 4,758,642, issued July 19, 1988.

BACKGROUND OF THE INVENTION

1. Field of the Invention

This invention relates generally to a composition of acrylic resins for coatings, adhesives, etc. and to a process for synthesis of the resins.

2. Description of the Prior Art

A large variety of acrylic coating compositions are known. Low solids coatings, i.e., those containing about 18 to 40 wt % solids and the balance solvents, have heretofore been developed in which the resins themselves are characterized by high molecular weights, e.g., molecular weights in the range of 20,000 to 40,000. Such high solvent concentrations are required with these high molecular weight resins in order to supply flowability and other properties necessary for ease in applying a uniform coating. Due to strict air pollution regulations, pollution abatement of solvents is of paramount importance. To this end, the industry has expended much effort in an attempt to develop electrostatically sprayable coatings containing high solids contents; that is, coatings having a lower amount of solvents in order to satisfy pollution regulations. Attempts to achieve high solids coatings by merely using more of the conventional high molecular weight resins in the coatings have not been successful since the increased solids content using these resins results in an unacceptably high viscosity, and often the larger amounts of the resins cannot themselves be dissolved. Efforts at developing a "super solvent" for these conventional high molecular weight resins have also not proved to be successful. One prior art approach has been to formulate coatings containing low molecular weight resins (e.g., of about 1,000 to 7,000 weight average molecular weight) would be desirable in high solids coatings in order to reduce the amount of solvents necessary in the blending for coating applications and, hence, the pollution difficulties associated with the solvents themselves. After application of the coatings to a surface, the coatings are cured to form a polymeric network of higher molecular weight and enhanced physical properties. These high solids acrylic coatings are useful as exterior finish for automobiles, trucks, metal furniture, and as an appliance finish.

K. K. Mitra, "Electrostatic Application of Paint", *Paint India*, vol. 29, no. 9, pp. 52–56 (1979) indicates that while non-polar solvents (aliphatic and aromatic hydrocarbons chlorinated solvents, terpenes, etc.) can be employed in electrostatically sprayable paints to increase bulk and resistivity, polar solvents are used to control resistivity. The polar group is said to include ketones, alcohols, esters, ethers, ether alcohols, and nitro paraffins, etc. The non-polar group is said to include aliphatic and aromatic hydrocarbons, chlorinated solvents, terpenes, etc.

Also illustrative of prior art, high solids acrylic resins are those disclosed in U.S. Pat. No. 4,276,212 and in European Patent Applications 27,719; 29,594 and 29,683.

Solvents which are indicated to be typical in these references (e.g., those mentioned in European Patent Application No. 29,594) are: Toluene, xylene, butyl acetate, acetone, methyl isobutyl ketone, methyl amyl ketone, methyl ethyl ketone, butyl alcohol and other aliphatic, cycloaliphatic and aromatic hydrocarbons, esters, ethers, ketones, and alcohols.

In a brochure entitled "Hexyl Acetate for the Coatings Industry" (Enjay Chemical Company), published prior to 1980, use of hexyl acetate as coating solvent in certain specific low solids acrylic coating compositions; in urethane coatings; in nitrocellulose coatings; and in baking enamels was disclosed.

U.S. Pat. Nos. 4,075,242 and 4,276,432 disclose the preparation of acrylic-based resins by use of polymerization media containing certain high boiling solvents and disclose the use of ethylene and propylene as comonomers.

European Patent No. 29,339 discloses the formation of bifunctional copolymers in which the monomers comprise from 5 to 25 wt % of monoethylenically unsaturated monomers having a glycidyl functionality, from 5 to 25% of monoethylenically unsaturated monomers having hydroxy functionality and 90 to 70 wt % of other monoethylenically unsaturated monomers, with acrylates as well as mixtures of acrylates and vinyl hydrocarbons being preferred. Only monovinyl aromatic hydrocarbons are particularly indicated as useful (e.g., styrene, alpha-methyl styrene, vinyl toluene, t-butyl styrene and chlorostyrene).

U.S. Pat. No. 4,369,296 relates to the production of methyl methacrylate homopolymers (or copolymers with certain copolymerizable vinyl monomers; e.g., styrene and alkyl-substituted styrene) in the presence of from 0.01 to 10 wt % of enol ethers derived from aliphatic or cycloaliphatic aldehydes and ketones.

U.S. Pat. No. 3,271,375 relates to the use, in combination with a free radical polymerizable material, of certain unsaturated heterocyclic organic compounds as molecular weight regulators. The prior art has sought to control the degree of polymerization via chain transfer content (in the preparation of acrylic oligomers for high solids coating resins) by use of relatively inactive solvents such as alkyl aromatics, high boiling ethers and benzyl alcohol. D. Rhum, et al., *J. Coatings Tech'n.* Vol. 55, no. 703, 75–79 (August 1983).

U.S. Pat. No. 4,532,294 relates to the preparation of acrylic copolymer resins employing polymerization solvents comprising certain alkanoic acid alkyl esters for copolymerization of hydroxy-substituted alkyl (meth)acrylate and non-hydroxy substituted alkyl (meth)acrylate monomers, and in optional presence of additional monomers comprising monovinyl aromatic hydrocarbons. Among the non-hydroxy substituted alkyl (meth)acrylate monomers which may be employed are (meth)acrylates as well as mixtures of acrylates and vinyl hydrocarbons.

U.S. Pat. No. 3,926,925 relates to novel interpolymers containing an olefin (an alpha-olefin, a 2-alkyl-1-olefin and a vinyl aromatic) polar monomers, such as an alkyl acrylate, and a fumarate ester or a maleic acid derivative which are prepared with a catalyst system of an alkyl aluminum halide and an organic peroxide. U.S. Pat. No. 3,959,225 relates to a thermally-staged process for preparing alternating interpolymers of one or more polar monomers and one or more mono or polyolefins in which a polar monomer-Lewis Acid complex is reacted with an olefin in the presence of an active oxygen compound. The olefins disclosed as useful in U.S. Pat. No. 3,959,225 are certain Type I olefins and Type III olefins.

U.S. Pat. No. 3,968,148 relates to oligomers of (i) about 10 to 90 wt % of 1-alkene; (ii) about 1 to 45 wt % of a straight or branched chain alkyl acrylate or (meth)acrylate in which the alkyl group contains 8 to 34 carbon atoms; and (iii) 1 to about 35 wt % of an acrylic acid, ester or nitrile, or a mixture of such acids, esters, nitriles, and amido and amino derivatives.

SUMMARY OF THE INVENTION

According to one aspect of the present invention, improved low molecular weight acrylic copolymer resins capable of cross-linking are provided by free-radical co-polymerization of a mixture of (i) at least one member selected from the group consisting of (meth)acrylic acid and hydroxy-substituted alkyl (meth)acrylates, (ii) at least one non-hydroxy substituted monomer selected from the group consisting of vinyl aromatic hydrocarbons and lower alkyl esters of methacrylic acid, and (iii) at least one alpha-olefin having from 7 to 20 carbon atoms per molecule. These low molecular weight acrylic resins are particularly useful as components in adhesives and in high solids acrylic coatings suitable for electrostatic spraying.

Low molecular weight acrylic copolymers find extensive application in coatings, adhesives, etc. The polymers are synthesized by free-radical copolymerization of monomers selected from the group comprising esters of acrylic and (meth)acrylic acids, styrene and its homologues, monomers bearing functional groups such as hydroxylalkyl acrylates and (meth)acrylates, acrylic and (meth)acrylic acids, glycidyl acrylate and (meth)acrylate, etc. in organic solvents.

We have found that all or at least a significant proportion of the alkyl acrylates, such as ethyl acrylate, butyl acrylate, and 2-ethylhexyl acrylate, which are used in coating resins to regulate Tg and impart flexibility to the coating films, can be substituted by $C_7$-$C_{20}$ alpha-olefins. This substitution can result in a reduction of molecular weight, improvement in color of the polymer solutions, and also potential improvement in the polymer's hydrphobocity, along with other important polymer properties.

DETAILED DESCRIPTION OF THE INVENTION

The oligomers of this invention will comprise: (i) from about 5 to 45 wt % and preferably from about 10 to 35 wt %, at least one of the group consisting of (meth)acrylic acid and hydroxy-substituted alkyl (meth)acrylate monomers (Monomer A), (ii) from about 20 to 80 wt %, preferably from about 25 to 70 wt %, of the non-hydroxy monomer selected from the group consisting of vinyl aromatic hydrocarbons and lower alkyl ester of methacrylic acid (Monomer B), (iii) from about 1 to 55 wt %, preferably from about 5 to 45 wt %, and more preferably from about 10 to 40 wt %, at least one alpha-olefin having a total of from 7 to 20 carbon atoms (Monomer C), and (iv) from about 0 to 64 wt %, preferably from about 0 to 54 wt %, and more preferably from 0 to 40 wt %, of the non-hydroxy monomer selected from the group of alkyl esters of acrylic acid (Monomer D), with the proviso that Monomers A and B be employed in a combined amount of at least 35 wt %, preferably from about 45 to 90 wt %, and most preferably from about 55 to 80 wt %, of the total monomer mixture, and with the further proviso that Monomers C and D be employed in a combined amount of less than 65 wt %.

The alpha-olefins suitable in this invention as a component of the polymerization mixture comprise normally liquid aliphatic alpha-olefins having from 7 to 20 carbon atoms per molecule, and preferably from 8 to 16 carbon atoms per molecule. The term "normally liquid", when applied herein to such olefins, is intended to refer to olefins which are in the liquid state at ambient conditions (25° C., 1 atm). Suitable aliphatic alpha-olefins are branched and straight chain olefins with terminal olefinic unsaturation, and comprise compounds of the formula (I):

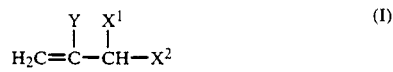

wherein $Y^1$, $X^1$ and $X^2$ are the same or different and are H or alkyl of from 1 to 17 carbon atoms, with the proviso that Y, $X^1$ and $X^2$ moieties contain a total of from 4 to 17 carbon atoms, preferably from 5 to 13 carbon atoms, more preferably from 6 to 11 carbon atoms, and most preferably from 7 to 9 carbon atoms.

A preferred class of olefins for use in this invention are aliphatic alpha-olefins of the formula (II):

$Y^2$ is H or alkyl of from 1 to 5 carbon atoms and wherein $X^3$ and $X^4$ are the same or different and are H or alkyl of from 1 to 11 carbon atoms, with the proviso that the $Y^2$, $X^3$ and $X^4$ moieties contain a total of from 5 to 11 carbon atoms.

Such alkyl groups of formulae (I) and (II) may be branched or straight chained, and exemplary thereof are methyl, ethyl, n-butyl, iso-butyl, sec-butyl, tert-butyl, n-pentyl, iso-pentyl, hexyl, heptyl, octyl, nonyl, decyl, undecyl, dodecyl, tridecyl, tetradecyl, hexadecyl, and the like. Exemplary of suitable aliphatic alpha-olefins, therefore, are 1-heptene, 3-ethyl-1-pentene, 1-octene, 3-methyl-1-heptene, 4-propyl-1-heptene, 1-nonene, 2-methyl-1-heptene, 1-decene, 1-undecene, 1-dodecene, the terminally unsaturated tridecenes, tetradecenes, pentadecenes and hexadecenes, and the like. Such alkyl groups of formulae (I) and (II) may also be phenyl-substituted; e.g., phenyl methyl, 2-phenyl ethyl, 3-phenyl butyl and the like.

The selected alpha-olefin will preferably be characterized by a normal boiling point (i.e., at 1 atm) of at least about 100° C., more preferably from about 115° to 250° C., and most preferably from about 150° to 200° C. The alpha-olefin will also preferably be substantially free of water and trace metals, as discussed below for the polymerization solvent, when the resins to be formed are intended for use as a component of electrostatic spray coatings.

Particularly preferred are mixed aliphatic alpha-olefins conventionally produced by ethylene oligomerization (i.e., the ethylene growth reaction).

The hydroxy-substituted alkyl (meth)acrylates which can be employed as Monomer A comprise members selected from the group consisting of the following esters of acrylic or methacrylic acid and aliphatic glycols: 2-hydroxy ethyl acrylate; 3-chloro-2-hydroxypropyl acrylate; 1-hydroxy-2-acryloxy propane; 2-hydroxypropyl acrylate; 3-hydroxypropyl acrylate; 2,3-dihydroxypropyl acrylate; 2-hydroxy-butyl acrylate; 4-hydroxybutyl acrylate; diethylene-glycol mono-acrylate; 5-hydroxypentyl acrylate; 6-hydroxyhexyl acrylate; triethyleneglycol mono-acrylate; 7-hydroxyheptyl acrylate; 1-hydroxy-2-methacryloxy propane; 2-hydroxy-propyl methacrylate; 3-hydroxypropyl methacrylate; 2,3-dihydroxypropyl methacrylate; 2-hydroxybutyl methacrylate; 3-hydroxybutyl methacrylate; 2-hydroxyethyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; and 7-hydroxyheptyl methacrylate. Although one of ordinary skill in the art will recognize that many different hydroxy-substituted alkyl (meth)acrylates including those listed above could be employed, the preferred hydroxy functional monomers for use in the resin of this invention are hydroxy-substituted (meth)acrylates, meaning alkyl acrylates and methacrylates having a total of 5 to 7 carbon atoms, i.e., esters of $C_2$-$C_3$ dihydric alcohols and acrylic or methacrylic acids.

Most preferably, the hydroxy-substituted alkyl (meth)acrylate monomer comprises a compound of the formula (III):

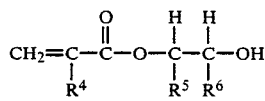
(III)

wherein $R^4$ is hydrogen or methyl and $R^5$ and $R^6$ are independently selected from the group consisting of hydrogen and alkyl of from 1 to 6 carbon atoms. Illustrative of these particularly suitable hydroxy-substituted alkyl (meth)acrylate monomers are 2-hydroxy ethyl methacrylate, 2-hydroxyethyl acrylate, 2-hydroxypropyl acrylate, 2-hydroxybutyl acrylate and 2-hydroxypropyl methacrylate.

The Monomer A can also comprise (meth)acrylic acid; i.e., acrylic acid or methacrylic acid, or a mixture thereof alone or together with any of the aforementioned hydroxy-substituted alkyl (meth)acrylate monomers.

The non-hydroxy monomers (Monomer B) comprise at least one member selected from the group consisting of vinyl aromatic hydrocarbon monomers and alkyl methacrylate monomers.

The vinyl aromatic hydrocarbons comprise monovinyl aromatic hydrocarbons containing from 8 to 12 carbon atoms and halogenated derivatives thereof having halo-substituted aromatic moieties (including styrene, alpha-methyl styrene, vinyl toluene, t-butyl styrene, chlorostyrene and the like).

The non-hydroxy substituted alkyl methacrylate monomers which may be employed are methacrylates (as before, meaning esters of methacrylic acids). Preferred non-hydroxy unsaturated monomers are esters of $C_1$-$C_4$ monohydric alcohols and methacrylic acid, e.g., methylmethacrylate, ethylmethacrylate, butylmethacrylate, etc.

Particularly preferred are alkyl methacrylate monomers selected from the group consisting of monomers of the formula (IV):

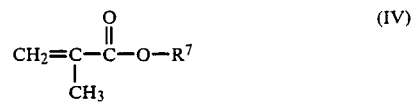
(IV)

wherein $R^7$ is alkyl of from 1 to 3 carbon atoms. Particularly preferred are ethyl methacrylate and methyl methacrylate.

The non-hydroxy substituted alkyl acrylate monomers which may be employed as Monomer D are alkyl esters of acrylic acids. Preferred non-hydroxy alkyl acrylates are esters of $C_1$-$C_4$ monohydric alcohols and acrylic acid, e.g., methyl acrylate, ethyl acrylate, butyl acrylate, and the like.

The monomer mixture can additionally include optional monomers such as vinyl chloride, vinylidene chloride, acrylonitrile, methacrylonitrile, and vinyl acetate.

The total monomer mixture utilized in the polymerization process step will comprise (a) from about 5 to 45 wt %, and preferably from about 10 to 35 wt %, of Monomer A, (b) from about 20 to 80 wt %, preferably from about 25 to 70 wt % of Monomer B, and (c) from about 1 to 55 wt %, more preferably from about 5 to 45 wt %, and most preferably from about 10 to 40 wt %, of the above alpha-olefins, and (d) from 0 to 64 wt %, and preferably from 0 to 54 wt %, of Monomer D, in addition to any optional monomers (discussed above). Generally, Monomer B will comprise a mixture of (1) an alkyl methacrylate in an amount of from about 0 to 80 wt %, more preferably from about 15 to 50 wt %, of the total monomer mixture, and (2) a monovinyl aromatic hydrocarbon (e.g., styrene and alpha-methyl styrene) which will be employed in an amount of from about 0 to 80 wt %, preferably from about 10 to 40 wt % of the total monomer mixture. Monomer A will typically comprise a mixture of (1) a hydroxy-substituted alkyl meth-acrylate of formula III, which will be present in an amount of from about 5 to 45 wt %, more preferably from about 8 to 30 wt %, of the total monomer mixture, and (2) acrylic acid or methacrylic acid which will be employed (alone or together) in an amount from about 0 to 20 wt %, more preferably from about 1 to 15 wt %, of the total monomer mixture. However, the total amount of Monomers A and B should be at least 35 wt %, preferably from about 45 to 90 wt %, and most preferably from about 55 to 80 wt %, of the total monomer mixture, and the total amount of Monomers C and D should be less than 65 wt %, preferably from about 10 to 55 wt %, and most preferably from about 20 to 45 wt %, of the total monomer mixture.

The remaining above-mentioned monomers may be present in an amount of up to 30 wt %, more typically from from 3 to 10 wt %, of the monomer mixture, where employed.

The organic polymerization solvents which can be employed comprise at least one member selected from the group consisting of ketones, ethers, glycols, glycol ethers, esters, keto ethers, ether esters, alcohols, nitro-substituted paraffins, aromatic solvents and halocarbon solvents. The organic moiety to which the ketone, and ether functional groups can be attached includes alkyl, typically about $C_1$ to $C_{20}$, preferably about $C_1$ to $C_{10}$, most preferably about $C_1$ to $C_5$ alkyl; aryl, typically about $C_6$ to $C_{14}$, preferably about $C_6$ to $C_{10}$, most preferably $C_6$ aryl; cycloalkyl, typically about $C_4$ to $C_{20}$, preferably about $C_6$ to $C_{12}$, most preferably about $C_6$ to $C_{10}$ cycloalkyl; aralkyl and alkaryl wherein the alkyl and aryl groups thereof are described above. Suitable keto ethers include molecules of the formula (V):

wherein $T^1$ and $T^2$ are each hydrocarbyl containing from 1 to 10 carbon atoms, and $T^3$ is straight or branched chain alkyl of from 1 to 6 carbon atoms. Illustrative of such keto ethers are $CH_3C(O)CH_2CH_2OCH_2CH_3$; $C_3H_7C(O)CH_3H_6OC_3H_7$; $CH_3C(O)CH_2C(OCH_3)(CH_3)CH_3$; $CH_3C(O)CH_2C(OC_2H_5)(CH_3)CH_3$; $C_2H_5C(O)CH_2CH_2OC_4H_9$; and the like. Nitro-paraffinic solvents include $NO_2$-substituted alkanes of 2 to 5 carbon atoms. Halocarbon solvents include chloro- and fluoro-substituted saturated hydrocarbons. Alcohol solvents include alkanols of 4 to 10 carbon atoms, and phenyl-substituted alkanols of 7 to 10 carbon atoms. Ether alcohols include alkoxy-substituted alkanols of from 3 to 8 carbon atoms. Glycol solvents include di-hydroxy substituted alkanes of from 2 to 6 carbon atoms. Glycol ether solvents include compounds of the formula $R'—O—R''$ wherein $R'$ is alkyl of from 1 to 6 carbon atoms, and $R''$ is hydroxy-substituted alkyl of from 2 to 6 carbon atoms.

Suitable ester solvents comprise normally liquid $C_1$ to $C_{13}$ alkyl esters of alkanoic acids having from 2 to 7 carbon atoms. Prepared ester solvents are those selected from the group consisting of compounds having the formula (VI):

wherein $R^1$ is a straight or branched or chain alkyl of from 1 to 6 carbon atoms, and $R^2$ is a straight or branched chain alkyl of from 1 to 13 carbon atoms, with the proviso that $R^1$ and $R^2$ together contain from 6 to 17 carbon atoms, and mixtures thereof. The "$R^1$" group can also comprise $C_2$ to $C_7$ alkyl having one carbon replaced by an ether oxygen (e.g., $C_2H_5—O—C_2H_4—$, $C_3H_7—O—C_2H_4—$, $CH_3—O—C_2H_4—$, $C_2H_5—O—C_3H_6—$, and the like). Exemplary of such ester solvents are butyl acetates, hexyl acetates, pentyl acetates, pentyl propionates, isobutyl isobutyrate, heptyl acetates, methyl pentanoates, ethyl pentanoates, pentyl pentanoates, ethyl hexanoates, butyl hexanoates, ethyl neopentanoate, methyl neoheptanoate, octyl acetates, nonyl acetates, decyl acetates, undecyl acetates, dodecyl acetates, tridecyl acetates and the like. Exemplary of esters wherein the carboxylic acid moiety is derived from an ether-containing acid (e.g., acids which are alkoxy-substituted) are ethyl 3-ethyoxypropionate, butyl 3-butoxypropionate, methyl 2-methoxyacetate, methyl 3-methoxypropionate, propyl 3-propoxypropionate and the like.

Especially preferred ester solvents of this invention are normally liquid esters selected from the group consisting of compounds of the formula (VII):

wherein $R^3$ is a straight or branched-chain alkyl having from 5 to 13 carbon atoms, and mixtures thereof. Exemplary of such preferred ester solvents herein are pentyl acetates, hexyl acetates, heptyl acetates, octyl acetates, nonyl acetates, decyl acetates, undecyl acetates, dodecyl acetates, and tridecyl acetates. The term "normally liquid esters" as used herein is intended to refer to esters which are in the liquid state at ambient conditions (25° C., 1 atm).

Suitable ketone solvents include methyl amyl ketone, methyl isobutyl ketone, methyl propyl ketone, isophorone, cyclohexanone, diethyl ketone, dibutyl ketone, methyl isopropyl ketone, methyl sec-butylketone, benzophenone, mixtures thereof, and the like. Suitable ether solvents include dibutyl ether, tetrahydrofuran, anisole, dioctyl ether, 1,2-dimethoxyethane, 1,4-dimethoxybutane. Suitable halocarbon solvents include 1,1,2-trichloroethane, tetrachloroethane and the like. Suitable nitroparaffinic solvents include nitropropane and nitroethane. Suitable alcohols include 2-ethyl hexanol, diacetone alcohol, phenethyl alcohol, benzyl alcohol, amyl alcohols, hexyl alcohols, heptyl alcohols, and the like. Suitable glycol ethers, esters and mixed ether and ester solvents include ethylene glycol diacetate, propylene glycol diacetate, Cellosolve ® acetate (registered trademark of the Union Carbide Corporation), butyl Cellosolve, Cellosolve, the Carbitols ® (registered trademark of the Union Carbide Corporation), methoxy propyl acetate, ethoxy propyl acetate and the like. Suitable aromatic solvents comprise alkyl-substituted benzenes of the formula (VIII):

wherein p is an integer of from 1 to 4, and X is in each instance in which it appears independently selected from the group consisting of straight and branched-chain alkyl of from 1 to 4 carbon atoms.

Illustrative of suitable alkyl-substituted benzene solvents for use in the solvent blends of this invention are ethyl benzene, isopropyl benzene, n-propyl benzene, 1-methyl-3-ethylbenzene, 1-methyl-4-ethylbenzene, 1,3,5-trimethylbenzene, 1-methyl-2-ethylbenzene, 1,2,4-trimethylbenzene, isobutylbenzene, sec-butylbenzene, 1-methyl-3-isopropylbenzene, 1-methyl-4-isopropylbenzene, 1,2,3-trimethylbenzene, 1-methyl-2-isopropylbenzene, 1,3-diethylbenzene, 1-methyl-3-n-propylbenzene, n-butylbenzene, 1,4-diethylbenzene, 1,3-dimethyl-5-ethylbenzene, 1,4-dimethyl-2-ethylbenzene, 1,3-dimethyl-4-ethylbenzene, 1,2-dimethyl-4-ethylbenzene, 1,2,4,5-tetramethylbenzene, 1,2,3,5-tetramethylbenzene and the like, toluene, xylene, cumene, alkyl-substituted benzenes in which the alkyl substituent comprises a total of at least 2 carbon atoms when the benzene ring is monoalkyl substituted and of at least 3 carbon atoms when the benzene ring is substituted by two or more alkyl groups, and aromatic groups distributed by a cyclic aliphatic ring (e.g., tetrahydronaphthalene), and mixtures of the foregoing.

The aromatic solvent component can also contain up to about 50 wt %, preferably less than about 40 wt %, and more preferably up to about 25 wt %, of other hydrocarbon solvents such as $C_6$ to $C_{11}$ aromatic solvents not satisfying the definition of formula III above, as well as $C_6$ to $C_{11}$ saturated aliphatic and cycloaliphatic hydrocarbons.

Especially preferred such polymerization solvents comprise from about 60 to 90 wt % of an organic solvent (e.g., a normally liquid ester of formula VI) and from about 10 to 40 wt % of an aromatic solvent of formula VIII.

The polymerization solvents are preferably characterized by a normal boiling point (at 25° C., 1 atm) of at least about 100° C., more preferably from about 115° to 250° C., and most preferably from about 150° to 200° C. In addition, when the polymers of the present invention are intended for use as a component of electrostatic spray coatings, the polymerization solvents are preferably substantially free of water (more preferably having a water content of less than 0.5 wt %) and trace metals (more preferably having a trace metals content of less than 0.004 wt %), and are characterized by a resistivity of at least 15 megohms, as determined by Ransburg resistivity meter.

In preparing the polymers of this invention, the selected monomers, including the desired hydroxy-substituted alkyl (meth)acrylate, non-hydroxy substituted alkyl (meth)acrylate and alpha-olefin, together with any modifying or other monomers, may be mixed and reacted by conventional free radical initiated polymerization in the selected polymerization solvent in such proportions as to obtain the copolymer desired. A large number of organic, free radical initiators are known in the art and are suitable for the purpose. These include: benzoyl peroxide; lauryl peroxide; t-butyl-hydroperoxide; acetylcyclohexylsulfonyl peroxide; di-isobutyryl peroxide; t-butylperoxypivalate; decanoyl peroxide; azobis-(2-methylpropionitrile); 2-t-butylazo-2-cyanobutane; tertiary butyl perbenzoate, dicumyl peroxide, ethyl 3,3-(t-amylperoxy)butyrate, ethyl 3,3-di(t-butylperoxy) butyrate, t-butyl cumyl peroxide, and di(butyl cumyl) peroxide, and di-t-butyl peroxide, and other dialkyl peroxides, peroxy ketals, and peroxyesters.

The total monomer mixture to be employed in preparing the polymers according to the process of this invention will generally comprise from about 30 to 95 wt %, preferably from about 50 to 90 wt %, of the total mass of monomers and solvent passed to the polymerization reaction vessel. Thus, the polymerization solvent will generally comprise from about 5 to 70 wt %, preferably from about 10 to 50 wt %, of the total mass of monomers and solvent passed to the polymerization vessel. The quantity of free radical initiators employed as catalyst in the reaction can also vary widely and will generally be present in an amount of from about 0.5 to 10 wt % of the total monomer components charged to the reaction mixture.

The conditions of temperature and pressure for conducting the polymerization reaction can vary widely. Generally, the polymerization will be conducted at a temperature of from about 100° to 240° C. (and preferably from about 130° to 210° C.) at atmospheric pressure. Pressures of from about 10 to 500 psig are entirely suitable, although higher or lower pressures can be employed. The polymerization reaction can be carried out in any of the conventional equipment employed by the industry for such reactions. Thus, the reaction vessel can comprise a stirred reactor in which an inert atmosphere (e.g., $N_2$, Ar) is maintained during the polymerization to avoid reactions with gaseous oxygen which compete, or interfere, with the desired polymerization reaction. However, the improved high solids resins of the present invention can also be formed by a polymerization conducted in the presence of air, thereby providing a polymerization process which is not critically sensitive to equipment leaks or malfunctions whereby air enters into conventional process equipment.

In order to form resins of improved color, it is preferred that the polymerization be conducted in the substantial absence of conjugated olefinic impurities comprising conjugated diolefins; internally unsaturated monoolefins in which the olefinic double bond is conjugated with an aromatic ring (e.g., as in indene); and internally unsaturated monoolefins which are alpha, beta unsaturated ketones, esters, amides and acids. More preferably, the polymerization mixture contains less than 100 ppm of such conjugated olefinic impurities.

The polymerization process can be carried out batchwise, semi-continuously, or continuously. The monomers and solvent system can be premixed or passed separately to the polymerization vessel alone, or in combination with the free radical initiators and other components. In addition, the components of the polymerization solvent may be premixed with each other or with any other material to be charged (e.g., with any of the monomers) or may be fed separately to the vessel.

The method of addition of the monomers can vary as described above, and is important in determining the final polymer composition. More specifically, the amount of alpha-olefin which is incorporated into the polymer is dependent upon the method of monomer addition. Since the reactivity of the alpha-olefin is much less than the reactivity of the other monomers, a high concentration of the alpha-olefin relative to the other monomers in the reaction zone is beneficial for incorporation of a significant amount of alpha-olefin into the polymer structure. Accordingly, when high alpha-olefin incorporation is desired, it is desirable to combine a large portion of the alpha-olefin with the mass of the polymerization solvent and introduce this solution to the reaction vessel separately from and prior to the introduction of the remaining monomers (e.g., Monomers A, B, and D and the balance of the alpha-olefin monomer). Depending on the desired amount of alpha-olefin incorporation into the polymer, the initial amount of alpha-olefin combined with the polymerization solvent can be adjusted, with the balance of the alpha-olefin combined with the other monomers. Generally, the higher the amount of alpha-olefin initially added to the polymerization solvent, the greater the alpha-olefin incorporation into the polymer structure.

Another method to increase the alpha-olefin incorporation into the polymer is to increase the addition time of the other monomers, thereby increasing the relative concentration of the alpha-olefin relative to the other monomers.

In one embodiment of the process of this invention, substantially all of the solvent is added to the reaction flask and is heated to the desired reaction temperature. At this point, an addition of substantially all (i.e., at least about 80 wt %) of the monomer is begun. Minor amounts of one or more of the monomers; i.e., up to about 20 weight percent of the total monomer weight may be placed in the reaction vessel with the solvent. The addition is carried out over at least about 30 minutes. Not all of the monomers need be mixed together; rather, separate additions of different monomers or different ratios of different monomers, may be used. Preferably, the addition time should be in the range of about 1 to 15 hours, most preferably 2 to 10 hours.

In a preferred embodiment of the process of this invention, from about 10 to 100 wt % (and more preferably from at least about 80 wt %, and most preferably at least about 90 wt %) of the alpha-olefin monomer is combined with the mass of the polymerization solvent and introduced to the reaction vessel separately from (and preferably prior to) the introduction of the remaining monomers (e.g., Monomers A, B and D, and the balance of the alpha-olefin monomer), and the balance of the alpha-olefin is charged to the reaction vessel along with the other such monomers.

The initiators which are utilized in the instant invention may be either mixed with the monomer or added separately over the general period of the monomer addition. In view of the high reaction temperature involved, addition of any major amount of the initiator to the solvent prior to the addition of the monomer will be of little or no effect.

Addition times of both initiators and monomers may vary and the various monomers may be added over regular periods of time, periodically, or over gradually increasing or decreasing periods of time, as long as the total amount of monomer addition is substantially within the ranges indicated.

The initiator should be added to the reaction over at least 30 minutes and preferably over the same or longer period of time that Monomers A, B and D are added. This can be accomplished, for example, by introducing the initiator to the reaction vessel simultaneously with the monomer feed, followed by the introduction of an additional amount of the initiator (generally from about 5 to 30 wt % of the total initiator to be charged) with stirring, to bring the polymerization of any remaining monomers to completion. Initiator levels should vary from about 0.5 percent to 10 percent, based on the total monomer weight, preferably 0.5 to 5 percent.

The time for which the polymerization reaction is allowed to proceed can also vary widely and will generally range from about 0.5 to 15 hours, preferably from about 1 to 10 hours.

Reaction temperature should be maintained within the desired temperature ranges following monomer addition for a time sufficient to cause conversion of all the monomer to polymer. This is usually measured by determining the solids content of the reaction mixture by measuring the amount of solvent that evaporates, when test samples are held for the desired time at the selected temperature (e.g., for about 20 minutes at 220° C.). The term "solids content" does not refer to whether the polymer prepared herein is liquid or solid in nature, but rather refers to the amount of material which is left behind after the evaporation at the selected conditions. Thus, the term "solids content" is synonymous with the term "percent non-volatile matter" or "percent NVM" at the selected conditions.

At this point, the reaction solvent may be removed by either increasing the heat or applying a vacuum or both. It is preferred that vacuum be utilized in addition to heat to minimize heat degradation of the polymer. Alternatively, and more preferably, the solvent can remain with the polymer resins for formulation of coatings therefrom, as will be described more completely below.

The acrylic resins produced by the process of this invention are preferably liquid in nature and characterized by weight average molecular weights ($M_w$) from about 800 to 15,000, and more preferably from about 1,000 to 10,000, and most preferably from about 1,000 to 8,000. Also, the acrylic resins produced by the process of this invention are preferably characterized by number average molecular weights ($M_n$) falling within a range of from about 500 to 8,000, and more preferably from about 700 to 5,500, and by $M_w/M_n$ ratios of from about 2 to 5, and more typically from about 2 to 4. Furthermore, the acrylic resins of the present invention will be preferably characterized by kinemmatic viscosities at 65% NVM of up to 10,000 cs, and more preferably from 100 to 5,000 cs (as determined by ASTM D445). These acrylic resins can then be employed in the formulation of coatings with or without the addition of other solvents. The components of such coating compositions formulated using these acrylic resins can be any of the conventional crosslinking agents, catalysts, anti-oxidants, UV absorbers and stabilizers, surface modifiers, wetting agents as well as pigments. These materials are conventional and a more complete description thereof is not necessary for a full understanding of this invention. For example, illustrative conventional UV absorbers and stabilizers are illustrated by those discussed in European Patent Application 29,594.

The coatings prepared by use of the acrylic resins of this invention can be applied to substrates, such as automobiles and the like, using conventional methods known to the art, such as roller coating, spray coating, electrostatic spray coating, dipping or brushing. Of course, the particular application technique will depend on the particular substrate to be coated and the environment in which the coating operation is to take place. A particularly preferred technique for applying the high solids compositions, particularly when applying the same to automobiles as top coats, is spray coating through the nozzle of a spray gun.

In accordance with another embodiment of the present invention, an improved method for formulating a high solids acrylic resin coating, intended for use in electrostatic spray applications, is provided wherein the acrylic resin, which is formed by conventional techniques or by use of the aforementioned improved polymerization process, is formulated into a high solids coating by use of a cutting solvent comprising a mixture of any of the above-discussed solvents, with or without one or more of the alpha-olefins of formula (I). The coating composition is preferably formulated to contain high solids (that is, at least about 50 wt % solids) and preferably from about 50 to 90 wt % solids, and most preferably from about 55 to 80 wt % solids.

As with the previously discussed embodiment of this invention, the acrylic resin coatings of this invention can be employed in combination with any of the conventional cross-linking agents, catalysts, anti-oxidants, UV absorbers and stabilizers, surface modifiers, wetting agents and pigments which are known in the art. These materials, again, are conventional and a more complete description thereof is not necessary for full understanding of this invention. For example, illustrative conventional UV absorbers and stabilizers are those illustrated by the discussion of European Patent Application 29,594 and by the surface modifiers and pigments described in European Patent Application 29,339, the disclosures of which are hereby incorporated by reference.

The novel coating compositions of this invention can be applied to a variety of substrates such as metal, wood, glass, and plastics such as polystyrene, polyurethane and copolymers of styrene, by any of the usual application methods such as by spraying, electrostatic spraying, dipping, brushing, flow coating, rolling and the like. Most preferably, the novel coating compositions of this invention are applied by electrostatic spraying.

The thus-formed coatings can be air-dryed or baked. The resulting coating is preferably from about 0.2 to 3 mils thick, and preferably 0.4 to 2.5 mils thick, and can be rubbed or polished in accordance with conventional techniques, if desired, to improve smoothness or apparent gloss or both.

After the novel coating composition is applied, the coating is preferably cured at about 80° to 250° C. for about 1 to 45 minutes.

While the acrylic resins of this invention have been described above for use in coatings, it will also be understood that such low molecular weight resins may be used in any of a varied number of end applications. For example, they may be used as plasticizers for rigid, inflexible polymeric systems. In addition, they may be utilized in combination with conventional curing agents to form films and plastic articles, and as binders and sizers. Examples of the curing agents which may be utilized for preparing cross-linked polymeric products include polyepoxides, di-isocyanates and urea-aldehyde, benzoguanamine-aldehyde, or melamine-aldehyde condensation products and the like. Particularly desired are the melamine-formaldehyde condensation products, such as polymethoxymethyl melamines, preferably the hexamethoxymethyl melamines. When melamine-formaldehyde or urea-formaldehyde curing agents are utilized, it is preferred that an acid catalyst (such as butyl acid phosphate, paratoluene sulfonic acid, naphthalene sulfonic acid, naphthalene di-sulfonic acids and dodecyl benzene sulfonic acid [as described in U.S. Pat. Nos. 3,979,478 and 4,075,176], and amine salts of any of the foregoing) be employed to increase the cure rate.

The process and compositions of this invention can be further illustrated by reference to the following examples, wherein parts are by weight unless otherwise indicated.

In the Examples, unless otherwise indicated, the following test procedures or devices were used for determining the corresponding properties:

TABLE 1

| Property Measurement | Test Method/Device |
|---|---|
| Viscosity | Brookfield model HAT synchro-electric viscometer |
| Electrical Resistivity | Ransburg 5650 paint resistance tester (manufactured by Ransburg) |
| Color | Pt/Co scale, Spectrometric measurements using Beckman DB67 grating spectro-photometer (ASTM D1209-79) |

The hexylacetate and heptylacetate used in the Examples were products of an esterification reaction between acetic acid and the corresponding hexyl or heptyl alcohol. The alcohol precursors themselves were formed in a commercial oxo reaction and each comprised a mixture of normal- and iso-alcohols. (Similar results would be achieved if pure normal- or iso-hexyl or heptyl alcohols were used.)

In the Examples, AROMATIC TM 100 solvent (manufactured by Exxon Company U.S.A.) comprised a narrow-cut aromatic solvent containing about 40 wt % trimethyl benzenes, 35 wt % methyl ethyl benzenes, 10 wt % propyl and isopropyl benzenes, 3 wt % ethyl dimethyl benzenes, 2 wt % methyl (n- and iso-) propyl benzenes, 2 wt % diethyl benzenes, <1 wt % each of mono butyl benzenes and tetramethyl benzenes, 6 wt % xylenes and minor amounts of ethyl benzene, $C_{10}$ and $C_{11}$ saturates and unknowns. AROMATIC TM 150 solvent (manufactured by Exxon Company U.S.A.) comprised a narrow-cut aromatic solvent containing about 23 wt % tetra-methyl benzenes, 22 wt % ethyl dimethyl benzenes, 15 wt % mono-, di- and tri-methyl indanes, 8 wt % diethyl benzenes, 8 wt % naphthalene, 5 wt % trimethyl benzenes, 2 wt % indane, and about 1 wt % or less of methyl ethyl benzenes, propyl benzenes, methyl propyl benzenes, butyl benzenes, hexyl benzenes, indene, methyl naphthalenes, xylenes, and unknowns.

Number average molecular weights ($M_n$) and weight average molecular weights ($M_w$) were found by gel permeation, with a polystyrene standard (using a Waters GPC-1 instrument).

Non-volatile matter (NVM) measurements were made by mixing a weighed sample of the product resin-polymerization solution with sufficient toluene to produce a 10:90 wt:wt resin product solution:toluene mixture and thereafter casting a thin film (about 0.05 mm) which was baked one hour at 150° C. in air, followed by weighing the residual material.

EXAMPLE 1

To a four-necked, five liter round bottomed flask fitted with two liquid feed tubes, a water jacketed reflux condenser, an air driven stirrer (made of 316 stainless steel) and a thermometer, was charged 688 g of heptylacetate together with 344 g of 1-decene. Nitrogen was continuously blown into the apparatus at a slow rate. The solvent plus 1-decene was heated over a 0.5 hour period to 160° C. polymerization temperature. A mixed liquid feed, comprising a blend of 240 g styrene, 1136 g of butyl acrylate, 480 g each of 2-hydroxyethyl methacrylate and methyl methacrylate, 64 g of acrylic acid, and the initiator, 24 g of tert-butyl peroxide were placed into a separate one gallon container. The monomer plus initiator solution was pumped to the reaction flask over a 187 minute period at 160° C. with continual stirring and $N_2$ flow. After the addition was complete, the reaction mixture was stirred for an additional 23 minutes at 160° C. Then an additional 12 g tert-butyl peroxide was added and the mixture stirred at 160° C. temperature for another 1.5 hours. The reaction mixture then was cooled with stirring and analyzed. The resin formed had:

| | |
|---|---|
| Viscosity (cps) | 21,000 |
| Color (Pt/Co) | 30.0 |
| Mn | 5,700 |
| Mw | 14,700 |
| Mw/Mn | 2.6 |
| % 1-decene in polymer | 12.4 |
| 1-decene conversion, % | ~100 |

This example has demonstrated essentially complete incorporation of 1-decene into the copolymer.

EXAMPLE 2

To a four-necked, five liter round bottomed flask fitted with two liquid feed tubes, a water jacketed reflux condenser, an air driven stirrer (made of 316 stainless steel) and a thermometer, was charged 1032 g of heptyl acetate solvent. N$_2$ was slowly blown into the apparatus continually. The solvent was heated over a 0.5 hour period to 160° C. polymerization temperature. The mixed monomer feed, comprising a blend of 240 g styrene, 896 g of butyl acrylate, 480 g each of 2-hydroxyethyl methacrylate and methyl methacrylate, 64 g of acrylic acid, 240 g 1-decene, and the initiator, 24 g of tert-butyl peroxide, were placed into a separate one gallon container. The monomer plus initiator solution was pumped to the reaction flask over a 180 minute period at 160° C. with continual stirring and N$_2$ flow. After the monomer blend was added, the reaction mixture was stirred an additional 60 minutes at the polymerization temperature. Then an additional 12 g tert-butyl peroxide was added and the mixture stirred at 160° C. temperature for another 1.5 hours. The reaction mixture then was cooled with stirring and analyzed. The resin formed had:

| | |
|---|---|
| NVM (%) | 68.1 |
| Viscosity (cps) | 8,100 |
| Color (Pt/Co) | 35 |
| Mn | 3,690 |
| Mw | 10,390 |
| Mw/Mn | 2.8 |
| % 1-decene in polymer | 7.0 |
| 1-decene conversion | 69.6 |

This example has demonstrated reduced incorporation 1-decene in copolymer when 1-decene was mixed with the monomer feed.

EXAMPLE 3

To a four-necked, five liter round bottomed flask fitted with two liquid feed tubes, a water jacketed reflux condenser, an air driven stirrer (made of 316 stainless steel) and a thermometer, was charged 778 g of heptyl acetate solvent N$_2$ was slowly blown into the apparatus continually. The solvent was heated over a 0.5 hour period to 160° C. polymerization temperature. The mixed monomer feed, comprising a blend of 240 g styrene, 896 g of butyl acrylate, 480 g each of 2-hydroxyethyl methacrylate and methyl methacrylate, 64 g of acrylic acid, and 240 g of 1-decene, was placed into a separate one gallon container and 36 g of t-butyl perbenzoate initiator in 254 g heptyl acetate solvent was placed in a separate container. The monomer feed and initiator solutions were separately pumped to the reaction flask at 160° C. with continual stirring and N$_2$ flow. The monomer addition time was 187 minutes and the initiator addition time was 240 minutes. When the addition was complete, the reaction mixture was stirred an additional hour at 160° C. Then the reaction mixture was cooled and analyzed. The resin formed had:

| | |
|---|---|
| NVM (%) | 67.5 |
| Viscosity (cps) | 11,750 |
| Color (Pt/Co) | 20 |
| Mn | 2,100 |
| Mw | 10,400 |
| Mw/Mn | 5 |
| % 1-decene in polymer | 6.2 |
| 1-decene conversion, % | 61 |

EXAMPLE 4

To a four-necked, five liter round bottomed flask fitted with two liquid feed tubes, a water jacketed reflux condenser, an air driven stirrer (made of 316 stainless steel) and a thermometer, was charged 994 g heptyl acetate solvent together with 200 g of 1-decene. N$_2$ was slowly blown into the apparatus continually. The solvent plus decene were heated over a 0.5 hour period to 160° C. polymerization temperature. The mixed monomer feed, comprising a blend of 240 g styrene, 636 g of butyl acrylate, 480 g each 2-hydroxyethyl methacrylate and methyl methacrylate, 64 g of acrylic acid, 300 g 1-decene, and the initiator, 48 g tert-butyl peroxide, were placed into a one gallon container. This monomer plus initiator solution was pumped to the reaction flask at 160° C. with continual stirring and N$_2$ flow. The initial rate of addition was approximately 500 ml over a 30 minute period, followed by the balance of the amount over 165 minutes. After the monomer blend was added, the reaction mixture was stirred for an additional 30 minutes at the polymerization temperature. Then a second charge containing 12 g tert-butyl peroxide initiator in 38 g Aromatic TM 150 solvent and 50 g heptyl acetate was added to the reaction flask over a 70 minute period at 160° C., with continual stirring and N$_2$ flow. When the second addition was complete, the reaction mixture was stirred an additional 30 minutes at 160°. The reaction mixture was then cooled with stirring and analyzed. The resin formed had:

| | |
|---|---|
| NVM (%) | 64.3 |
| Viscosity (cps) | 2,130 |
| Color (Pt/Co) | 14 |
| Mn | 2,660 |
| Mw | 7,470 |
| Mw/Mn | 2.8 |
| % 1-decene in polymer | 12.8 |
| 1-decene conversion, % | 57.3 |

EXAMPLE 5

To a four-necked, five liter round bottomed flask fitted with two liquid feed tubes, a water jacketed reflux condenser, an air driven stirrer (made of 316 stainless steel) and a thermometer, was charged 944 g heptyl acetate solvent together with 200 g of 1-decene N$_2$ was slowly blown into the apparatus continually. The solvent plus decene were heated over a 0.5 hour period to 160° C. polymerization temperature. The mixed monomer feed, comprising a blend of 240 g styrene, 636 g of butyl acrylate, 480 g each of 2-hydroxyethyl methacrylate and methyl methacrylate, 64 g of acrylic acid, 300 g 1-decene, and the initiator, 48 g tert-butyl peroxide, were placed into a separate one gallon container. The monomer plus initiator solution was pumped to the reaction flask over a 300 minute period at 160° C. with continual stirring and N$_2$ flow. The initial rate of addition was approximately 500 ml over a 30 minute period, followed by the balance of the amount over 270 minutes. After the addition was completed, the reaction mixture was stirred an additional 30 minutes. Then a second charge containing 12 g tert-butyl peroxide initiator in 38 g Aromatic TM 150 and 50 g heptyl acetate was added to the flask over a 75 minute period at 160° C. with continual stirring and N$_2$ flow. When the second addition was complete, the reaction mixture was stirred an additional 30 minutes at 160° C., and then cooled and analyzed. The resin formed had:

| | |
|---|---|
| NVM (%) | 64.8 |
| Viscosity (cps) | 1,640 |

-continued

| | |
|---|---|
| Color (Pt/Co) | 20 |
| Mn | 1,860 |
| Mw | 6,280 |
| Mw/Mn | 3.4 |
| % 1-decene in polymer | 13.4 |
| 1-decene conversion | 60.8 |

EXAMPLE 6

To a four-necked, five liter round bottomed flask fitted with two liquid feed tubes, a water jacketed reflux condenser, an air driven stirrer (made of 316 stainless steel) and a thermometer, was charged 944 g heptyl acetate solvent together with 100 g 1-decene. $N_2$ was slowly blown into the apparatus continually. The solvent plus decene was heated over a 0.5 hour period to 160° C. polymerization temperature. The mixed monomer feed, comprising a blend of 240 g styrene, 636 g of butyl acrylate, 480 g each of 2-hydroxyethyl methacrylate and methyl methacrylate, 64 g of acrylic acid, 400 g 1-decene, and the initiator, 48 g butyl peroxide, were placed into a one gallon container. The monomer plus initiator solution was pumped to the reaction flask over a 288 minute period at 160° C. with continual stirring and $N_2$ flow. The initial rate of addition was approximately 633 ml over a 38 minute period, followed by the balance of the amount over 250 minutes. After the addition was completed, the reaction mixture was stirred an additional 30 minutes. Then a second charge containing 12 g tert-butyl peroxide initiator in 38 g Aromatic ™ 150 solvent and 50 g heptyl acetate was added to the flask over a 70 minute period at 160° C. with continual stirring and $N_2$ flow. When the second addition was complete, the reaction mixture was stirred an additional 30 minutes at 160° C., and then cooled and analyzed. The resin formed had:

| | |
|---|---|
| NVM (%) | 63.5 |
| Viscosity (CPS) | 1,050 |
| Color (PT/CO) | 16.5 |
| Mn | 2,610 |
| Mw | 5,260 |
| Mw/Mn | 2.0 |
| % 1-decene in polymer | 11.6 |
| 1-decene conversion | 51.7 |

EXAMPLE 7

To a four-necked, five liter round bottomed flask fitted with two liquid feed tubes, a water jacketed reflux condenser, an air driven stirrer (made of 316 stainless steel) and a thermometer, was charged 994 g heptyl acetate solvent together with 100 g of 1-decene. $N_2$ was slowly blown into the apparatus continually. The solvent plus decene was heated over a 0.5 hour period to 165 polymerization temperature. The mixed monomer feed, comprising a blend of 240 g styrene, 636 g of butyl acrylate, 480 g each of 2-hydroxyethyl methacrylate and methyl methacrylate, 64 g of acrylic acid, 400 g of 1-decene, and the initiator, 48 g of tert-butyl peroxide, were placed into one gallon container. The monomer plus initiator solution was pumped to the reaction flask over a 360 minute period at 165° C. with continual stirring and $N_2$ flow. The initial rate of addition was approximately 1,000 ml over a 60 minute period, followed by the balance of the amount over 300 minutes. After the addition was complete, the reaction mixture was stirred an additional 30 minutes. Then a second charge containing 12 g tert-butyl peroxide initiator in 38 g Aromatic ™ 150 solvent and 50 g heptyl acetate was added to the flask over a 75 minute period at 165° C. with continual stirring and $N_2$ flow. When the second addition was complete, the reaction mixture was stirred and additional 30 minutes at 165° C., and then cooled and analyzed. The resin formed had:

| | |
|---|---|
| NVM (%) | 63.9 |
| Viscosity (cps) | 980 |
| Color (Pt/Co) | 18.5 |
| Mn | 2,130 |
| Mw | 6,210 |
| Mw/Mn | 2.9 |
| % 1-decene in polymer | 12.2 |
| 1-decene conversion | 54.5 |

EXAMPLE 8

To a four-necked, five liter round bottomed flask fitted with two liquid feed tubes, a water jacketed reflux condenser, an air driven stirrer (made of 316 stainless steel) and a thermometer, was charged 944 g heptyl acetate solvent together with 100 g of 1-decene. $N_2$ was slowly blown into the apparatus continually. The solvent plus decene were heated over a 0.5 hour period to 160° C. polymerization temperature. The mixed monomer feed, comprising a blend of 240 g styrene, 636 g of butyl acrylate, 480 g each of 2-hydroxyethyl methacrylate and methyl methacrylate, 64 g of acrylic acid, 400 g of 1-decene, and the initiator, 48 g of tert-butyl peroxide, were placed into a one gallon container. The monomer plus initiator solution was pumped to the reaction flask over a 345 minute period at 160° C. with continual stirring and $N_2$ flow. The initial rate of addition was approximately 1,000 ml over a 60 minute period, followed by the balance of the amount over 285 minutes. After the addition was completed, the reaction mixture was stirred an additional 30 minutes. Then a second charge containing 12 g tert-butyl peroxide initiator in 38 g Aromatic ™ 150 solvent and 50 g heptyl acetate was added to the flask over a 70 minute period at 160° C. with continual stirring and $N_2$ flow. When the second addition was complete, the reaction mixture was stirred an additional 30 minutes at 160° C., and then cooled and analyzed. The resin formed had:

| | |
|---|---|
| NVM (%) | 64.8 |
| Color (Pt/Co) | 19 |
| Mn | 2,930 |
| Mw | 8,820 |
| Mw/Mn | 3.6 |
| % 1-decene in polymer | 13.4 |
| 1-decene conversion | 60.8 |

EXAMPLE 9

To a four-necked, five liter round bottomed flask fitted with two liquid feed tubes, a water jacketed reflux condenser, an air driven stirrer (made of 316 stainless steel) and a thermometer, was charged 832 g heptyl acetate solvent together with 300 g 1-decene. $N_2$ was slowly blown into the apparatus continually. The solvent plus decene were heated over a 0.5 hour period to 170° C. polymerization temperature. The mixed monomer feed, comprising a blend of 240 g styrene, 636 g of butyl acrylate, 480 g each of 2-hydroxyethyl methacrylate and methyl methacrylate, 64 g of acrylic acid, and 200 g 1-decene were placed into a separate one gallon container and 60 g of tert-butyl peroxide as initiator in 100 g Aromatic TM 150 solvent and 100 g heptyl acetate solvent was placed in a separate container. The monomer feed and initiator solutions were separately pumped to the reaction flask at 170° C. with continual stirring and N₂ flow. The monomer mixture was added at the rate of about 1,000 ml during the first ½ hour, and the rest at the rate of 250 ml/hr over 330 minutes. The initiator solution was added continuously over a 480 minute period time period. The reaction mixture then was cooled with stirring and analyzed. The resin formed had:

| NVM (%) | 66.9 |
|---|---|
| Viscosity (cps) | 740 |
| Color (Pt/Co) | 17.5 |
| % 1-decene in polymer | 16.1 |
| 1-decene conversion | 75.5 |

This example has demonstrated essentially complete incorporation of 1-decene into the copolymer.

EXAMPLE 10

To a four-necked, five liter round bottomed flask fitted with two liquid feed tubes, a water jacketed reflux condenser, an air driven stirrer (made of 316 stainless steel) and a thermometer, was charged 832 g heptyl acetate solvent together with 300 g 1-decene. N₂ was slowly blown into the apparatus continually. The solvent plus decene were heated over a 0.5 hour period to 170° C. polymerization temperature. The mixed monomer feed, comprising a blend of 240 g styrene, 636 g of butyl acrylate, 480 g each of 2-hydroxyethyl methacrylate and methyl methacrylate, 64 g of acrylic acid and 200 g 1-decene were placed into a one gallon container and 60 g of tert-butyl peroxide as initiator in 100 g of Aromatic TM 150 solvent and 100 g of heptyl acetate solvent was placed in a separate container. The monomer feed and initiator solutions were separately pumped to the reaction flask at 170° C. with continual stirring and N₂ flow. The monomer mixture was added at the rate of about 1,000 ml/hour during the first 1 hour, and the rest at the rate of 250 ml/hour over a 230 minute time period. The initiator solution was added continuously over a 415 minute time period. The reaction mixture then was cooled with stirring and analyzed. The resin formed had:

| NVM (%) | 66.5 |
|---|---|
| Viscosity (cps) | 1,000 |
| Color (Pt/Co) | 16 |
| Mn | 5,700 |
| Mw | 14,700 |
| Mw/Mn | 2.6 |
| % 1-decene in polymer | 15.6 |
| 1-decene conversion | 72.7 |

EXAMPLE 11

To a four-necked, five liter round bottomed flask fitted with two liquid feed tubes, a water jacketed reflux condenser, an air driven stirrer (made of 316 stainless steel) and a thermometer, was charged 832 g heptyl acetate solvent together with 400 g of 1-decene. N₂ was slowly blown into the apparatus continually. The solvent plus decene were heated over a 0.5 hour period to 170° C. polymerization temperature. A mixed monomer feed, comprising a blend of 240 g styrene, 636 g of butyl acrylate, 480 g each of 2-hydroxyethyl methacrylate and methyl methacrylate, 64 g of acrylic acid and 100 g 1-decene were placed into a separate one gallon container and 60 g of tert-butyl peroxide as initiator in 100 g of Aromatic TM 150 solvent and 100 g heptyl acetate solvent was placed in a separate container. The monomer feed and initiator solutions were separately pumped to the reaction flask at 170° C. with continual stirring and N₂ flow. The monomer mixture was added at the rate of about 1,000 ml/hour during the first one hour, and the rest at the rate of 250 ml/hour over a 215 minute time period. The initiator was added continuously over a 410 minute time period. The reaction mixture then was cooled with stirring and analyzed. The resin formed had:

| NVM (%) | 66.5 |
|---|---|
| Viscosity (cps) | 1,060 |
| Color (Pt/Co) | 18.5 |
| % 1-decene in polymer | 15.6 |
| 1-decene conversion | 72.7 |

EXAMPLE 12

To a four-necked, five liter round bottomed flask fitted with two liquid feed tubes, a water jacketed reflux condenser, an air driven stirrer (made of 316 stainless steel) and a thermometer, was charged 672 g heptyl acetate solvent together with 400 g of 1-decene. N₂ was slowly blown into the apparatus continually. The solvent plus decene were heated over a 0.5 hour period to 170° C. polymerization temperature. The mixed monomer feed, comprising a blend of 400 g styrene, 636 g of butyl acrylate, 480 g each of 2-hydroxyethyl methacrylate and methyl methacrylate, 64 g of acrylic acid and 100 g 1-decene were placed into a separate one gallon container and tert-butyl peroxide in initiator in 100 g Aromatic TM 150 and 100 g heptyl acetate solvent was placed in a separate container. The monomer feed and initiator solutions were separately pumped to the reaction flask at 170° C. with continual stirring and N₂ flow. The monomer mixture was added at the rate of about 1,000 ml/hour during the first hour and the rest at the rate of 250 ml/hour over a 225 minute time period. The initiator solution was added continuously over a 405 minute time period, and therefore stirring at polymerization was continued. The reaction mixtures then was cooled with stirring and analyzed. The resin formed had:

| NVM (%) | 69.7 |
|---|---|
| Viscosity (cps) | 3,300 |
| Color (Pt/Co) | 17.9 |
| Mn | 2,130 |
| Mw | 7,680 |
| Mw/Mn | 3.6 |
| % 1-decene in polymer | 12.9 |
| 1-decene conversion | 62.9 |

EXAMPLE 13

To a four-necked, five liter round bottomed flask fitted with two liquid feed tubes, a water jacketed reflux condenser, an air driven stirrer (made of 316 stainless steel) and a thermometer, was charged 944 g heptyl acetate solvent together with 200 g 1-hexadecene. N₂ was slowly blown into the apparatus continually. The solvent plus hexadecene were heated over a 0.5 hour period to 160° C. polymerization temperature. The mixed monomer feed, comprising a blend of 240 g styrene, 636 g of butyl acrylate, 480 g each of 2-hydroxyethyl methacrylate and methyl methacrylate, 64 g of acrylic acid, 300 g of 1-decene, and the initiator, 48 g tert-butyl peroxide, were placed into a one gallon container. The monomer plus initiator solution was pumped to the reaction flask over a 300 minute period at 160° C. with continual stirring and $N_2$ flow. The initial rate of addition was approximately 500 ml over a 30 minute period, followed by the balance of the amount over 270 minutes. After the addition was completed the reaction mixture was stirred an additional 30 minutes. Then a second charge containing 12 g tert-butyl peroxide initiator in 38 g Aromatic ™ 150 solvent and 50 g heptyl acetate was added to the flask over a 75 minute period at 160° C. with continued stirring and $N_2$ flow. When the second addition was complete, the reaction mixture was stirred an additional 30 minutes at 160° C., and then cooled and analyzed. The reaction mixture was then cooled with stirring. The resin formed had:

| | |
|---|---|
| NVM (%) | 65.1 |
| Viscosity (cps) | 2,600 |
| Color (Pt/Co) | 18.5 |
| Mn | 2,670 |
| Mw | 7,670 |
| Mw/Mn | 2.6 |
| % 1-decene in polymer | 62.9 |
| 1-decene conversion | 13.8 |

This example has demonstrated essentially complete incorporation of 1-decene into the copolymer.

COMPARATIVE EXAMPLE 14

The procedure of Example 11 was repeated using a monomer mixture comprising 240 g styrene, 636 g butyl acrylate, 480 g 2-hydroxyethyl methacrylate, 480 g methyl methacrylate, 64 g acrylic acid and 100 g decane (instead of 1-decene), and using 50 g tertiary butyl peroxide initiator in 840 g heptyl acetate to which 400 g decane was added in the reaction vessel prior to feeding the monomer mixture. The polymerization was carried out in the following sequence at polymerization conditions: monomer mixture added over 305 minutes time period; continued stirring; additional initiator feed (10 g tertiary butyl peroxide in 30 g AROMATIC 150 ™ solvent) begun at 310 minutes and concluded at 365 minutes; stirred for additional 30 minutes, for a total polymerization time of 395 minutes.

Phase separation of the polymer and solvent phases was observed throughout the reaction, and the lower resin phase was observed to be cloudy with suspended resin solids distributed in the lower layer.

EXAMPLE 15

To a four-necked, five liter round bottomed flask fitted with a one liter dropping funnel, a water jacketed reflux condenser, an air driven stirrer (made of 316 stainless steel) and a thermometer, was charged 512 g of hexyl acetate as polymerization solvent, together with 128 g of 2,4,4-trimethyl-1-pentene (TMP) monomer. Air was blown into the apparatus at the rate of 8cc/min, and stirring at 250 RPM was commenced. The solvent was heated over a 0.5 hour period to 140° C. A blend of 480.0 g styrene, 480.0 g butyl acrylate, 240.0 g 2-hydroxyethyl methacrylate and 6 wt % of t-butyl perbenzoate as initiator (based on total weight of the monomers and initiator), was placed in the dropping funnel and added to the polymerization solvent with stirring and at the metered air-flow over a three hour period. Temperature was maintained between 138°–145° C. After all the monomer blend was added, the reaction mixture was stirred for an additional 30 minutes at 140° C. At this point a final amount of 6.0 g of t-butyl perbenzoate in 6.0 g of hexyl acetate was added slowly and the mixture stirred at 140° C. for a final two hours.

The data thereby obtained indicated the polymer resin so produced had a Pt/Co color of 20, a viscosity of 3700 cps, and contained 69.1% NVM. The TMP conversion was 51%, and there was 4.9 wt % TMP incorporated into the polymer.

When this experiment was repeated without the TMP monomer, the resulting resin had a Pt/Co color of 28, a resin viscosity of 2880 cps, and only 65.7% NVM.

EXAMPLE 16

To a four-necked, five liter round bottomed flask fitted with two liquid feed tubes, a water jacketed reflux condenser, an air driven stirrer (made of 316 stainless steel) and a thermometer, was charged 650 g of heptyl acetate solvent together with 1195 g of 1-decene. $N_2$ was slowly blown into the apparatus continually. The solvent plus dodecene were heated over a 0.5 hour period to 160° C. polymerization temperature. The mixed monomer feed, comprising a blend of 1140 g of methyl methacrylate, and 360 g of acrylic acid were placed into a one gallon container and 65 g of tert-butyl peroxide as initiator in 20 g heptyl acetate and 80 g Aromatic ™ 100 solvent was placed in a separate 200 ml container. The monomer feed and initiator solutions were separately pumped to the reaction flask at 160° C. with continual stirring and $N_2$ flow. The monomer mixture was added at the rate of about 250 ml/hour over 340 minutes. The initiator solution was added continuously over a 400 minute period of time. The reaction mixture then was cooled with stirring and analyzed. The resin formed had:

| | |
|---|---|
| NVM (%) | 63.9 |
| Viscosity (cps) | 14,200 |
| 1-decene conversion | 55.4 |
| % 1-decene in polymer | 30.0 |

It will be obvious that various changes and modifications may be made without departing from the invention and it is intended, therefore, that all matter contained in the foregoing description shall be interpreted as illustrative only and not limitative of the invention.

What is claimed is:

1. A polymerizable composition suitable for application after polymerization to a surface by electrostatic spraying as a high solids coating which comprises:
    (a) from about 30 to 95 wt % of a monomer mixture comprising:
        (i) from about 5 to 40 wt % of at least one member selected from the group consisting of hydroxy-substituted alkyl (meth)acrylates, acrylic acid and methacrylic acid;
        (ii) from about 20 to 80 wt % of at least one member selected from the group consisting of non-hydroxy substituted alkyl (meth)acrylates and vinyl aromatic hydrocarbons;
        (iii) from about 0.5 to 6 wt % of at least one free radical polymerization initiator;

(iv) from about 1 to 55 wt % of at least one alpha-olefin selected from the group consisting of internal aliphatic olefins of from 7 to 20 carbon atoms in an amount of from said monomer mixture; and (v) from about 0 to 64 wt % of at least one alkyl ester of acrylic acid, with the provisos (a) that the sum of monomers (i) and (ii) comprise at least about 35 wt % of said monomer mixture, and (b) that the sum of monomers (iv) and (v) comprise less than about 65 wt % of said monomer mixture.

(b) from about 5 to 70 wt % of a polymerization solvent comprising:

(i) at least one normally liquid ester selected from the group consisting of compounds having the formula:

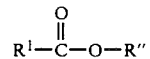

wherein $R^1$ is a straight or branched chain alkyl of 1 to 6 carbon atoms, and $R''$ is a straight or branched chain alkyl of 8 to 13 carbon atoms, with the proviso that $R^1$ and $R''$ together contain from 9 to 17 carbon atoms; and 2. The polymerizable composition of claim 1 wherein said monomer mixture further comprises from about 5 to 30 wt % of at least one monovinyl aromatic hydrocarbon containing from 8 to 12 carbon atoms.

* * * * *